C. McLAREN.
MULTIPLE DISK POWER TRANSMISSION.
APPLICATION FILED JUNE 18, 1914.
1,157,238. Patented Oct. 19, 1915.
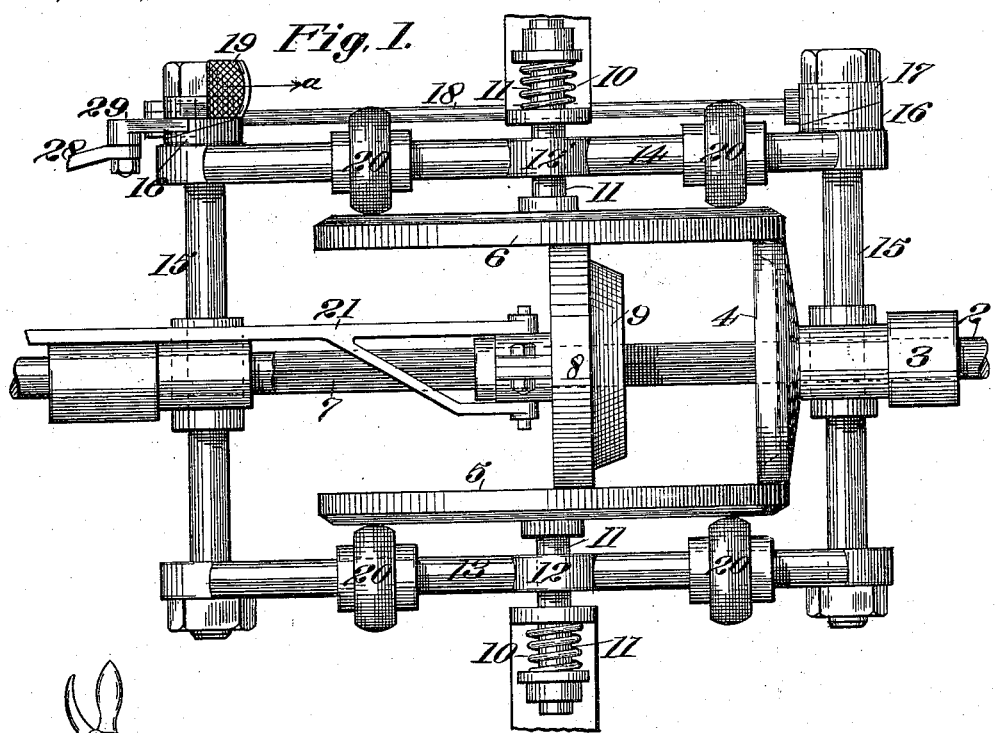
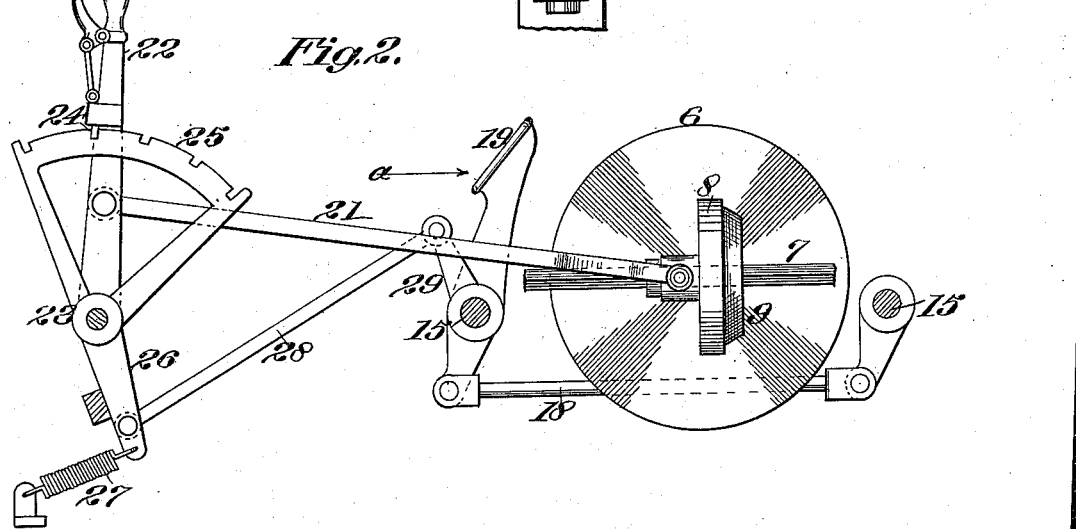
WITNESSES:
Charles Rickles
Thos. Eastberg
INVENTOR
Chester McLaren.
BY G. H. Strong
ATTORNEY

UNITED STATES PATENT OFFICE.

CHESTER McLAREN, OF OAKLAND, CALIFORNIA.

MULTIPLE-DISK POWER TRANSMISSION.

1,157,238.  Specification of Letters Patent.  Patented Oct. 19, 1915.

Application filed June 18, 1914. Serial No. 845,824.

*To all whom it may concern:*

Be it known that I, CHESTER McLAREN, a citizen of the United States, residing at Oakland in the county of Alameda and State of California, have invented new and useful Improvements in Multiple-Disk Power Transmission, of which the following is a specification.

This invention relates to power transmission apparatus.

It is an object of the present invention to provide a transmission apparatus whereby the loss of power by friction in the apparatus may be reduced to a minimum, and thereby to increase the transmitting efficiency of the apparatus.

It is a further object of the present invention to provide in the transmission axially alined, driving and driven shafts with means whereby said shafts may be directly and firmly coupled for the direct transmission of power without the introduction of an intermediate medium; thus conserving power.

It is a further object of the invention to provide in a friction transmission, means for varying the relative speeds and direction of rotation of the driving shaft and the driven shaft, with means for transmitting motion from one to the other with a force substantially equal to each side of the driven member.

It is a further object of the present invention to provide coördinate manually operated controlling means for the transmission whereby the transmission mechanism may be readily controlled.

The invention consists of the parts and the construction and combination of parts as hereinafter more fully described, having reference to the accompanying drawings, in which—

Figure 1 is a plan view of the transmission. Fig. 2 is a side elevation thereof partly broken away and in section.

The invention includes a driving or engine shaft 2 appropriately journaled as at 3, and which is provided with a clutch member 4, the peripheral face of which is designed to be utilized by co-action with oppositely disposed parallel disks 5—6 to transmit power to a driven shaft 7. Splined upon and slidable along the driven shaft 7 is a driven friction head 8, engageable by the disks and provided with a clutch face 9 on one side for coöperation with the complementary clutch 4 of the engine shaft.

The intermediate transmission disks 5—6 are shown as parallel and are forced from each other by means of expansion springs 10 surrounding stems 11 of the disks 5—6, the former of which is shown as slidably mounted in a journal 12 on a part 13 of the apparatus, while the stem 11 of the disk 6 is slidably mounted in a bearing 12′ on a beam or actuating member 14, which is slidably mounted upon parallel tension members 15, and the ends of which are provided with bosses having inclined or cam surfaces 16 of a common pitch upon which react cams 17, complementary to their bosses 16. The cams 17 are turnable upon the rods 15, and interconnected by a link 18, one of the cams 17 having a lever or foot pedal 19 whereby it may be rocked on its bearing rod 15, the rocking movement being transmitted through the connecting link 18 to the other cam 17.

When the lever or foot pedal 19 is pressed in the direction of the arrow $a$, the cams 17 act upon the bosses 16 of the sliding beam 14 to force the latter laterally toward the alined shafts 2—7, or draw the spaced members 13—14 toward each other. Mounted upon each of the members 13—14 are anti-friction rollers 20 which bear against the surfaces of their respective adjacent transmission disks 5—6, and as there are two of the bearing rollers 20 on each member 13—14, and these being disposed on opposite sides of the disk stems 11, when the sliding beam 14 moves toward the axis of the shaft 7 the bearing rollers 20 on their respective supports 13—14 act with equal pressure upon their respective disks 5—6 on opposite sides of their stems.

The purpose of providing the bearing rollers 20 on the members 13—14 is to eliminate any tilting action of the disks 5 or 6, and thereby prevent their binding or clamping and obviate side thrust or pressure of their stems 11 in their respective bearings. The roller bearings 20 when reacting upon the adjacent surfaces of their respective disks 5—6 press the latter laterally toward the driving head 4 and the driven head 8 and thereby act upon these driving heads with equal pressure from opposite sides, and thus eliminate side thrust and friction of the shafts 2—7 in their respective bearings.

For the purpose of varying the speed of the driven shaft with relation to the speed of the driving shaft, the driven head 8 is shiftable along the shaft 7 by means of a link 21 connected to the hub of the head 8 and to an operating lever 22, which is pivoted upon a support or shaft 23 suitably mounted upon the frame of the apparatus.

The operating lever 22 is provided with a latch or dog 24, engageable with a notched quadrant 25, which is pivoted upon the support 23 and has an extension or arm 26 to which is connected a spring 27, and to which is also connected a link attached to an arm 29 operative upon the shifting mechanism of the pressure beam 14; the spring 27 acting normally to draw the cams 17 from forcing engagement with the cam hubs 16 of the pressure beam 14 so that when pressure is applied to the foot pedal 19 to rock the cams 17, the force is opposed to the tension of the springs 27. If, by means of the driving lever 22 the driven head 8 be shifted into the plane of the axis of the disks 5—6, and pressure were applied to the foot pedal 19 to shift the beam 14 inward, the driven head 8 being in the neutral position would remain idle, but as it is shifted forward toward the driving head 4, and the disks are shifted into frictional engagement with the driving head 4 and with the driven head 8, then the latter would be rotated at a speed which would be proportional to the distance of the head 8 from the axis of the disks 5—6. If the driven head 8 be retracted rearwardly from the axis of the disks 5—6, and pressure applied to the disks, then the direction of the rotation of the head 8 and shaft 7 would be reverse to the direction of the rotation of the driving head 4.

It is one of the important features of the present invention that the driving head 8 may be moved into direct frictional clutching engagement with the driving clutch 4 without the interposition of intermediate transmitting means, thus avoiding the loss of power such as is incident to the use of any intermediate transmitting means and also reducing the weight and cost of the transmission apparatus by their omission.

The shifting of the pressure beam being controlled by the movement of the cams 17 when rocked to react upon the cam hubs 16, and since the cams 17 are normally retracted to relieve disk 6 from the pressure of the roller bearings 20, if while the clutch 9 is shifted into direct driving engagement with the driving clutch 4, it is desired to disconnect the clutch members, this may be accomplished by a slight forward movement of the operating pedal 19 which is connected through the link 28 and the arm 26 to the quadrant 25. Thus, by slightly rocking the foot pedal 19 the quadrant 25 will be rocked, and this action will serve through the medium of the latched lever 22 and its connecting link 21 to retract the clutch member 9 to unclutch the parts without bringing the frictional transmitting disks 5—6 into frictional engagement with the members 4—8.

The required movement of the clutch member 9 to disengage same from operative connection with the clutch member 4 is obviously but very slight, and since the cam surfaces 16 and 17 must be moved to a very much greater extent to effect movement of the parts 13 and 14 to cause disks 5 and 6 to operatively engage the clutch members 4 and the peripheral face 8 of clutch member 8, it will therefore be seen that slight movement of pedal 19 will not be sufficient to bring disks 5 and 6 into operative engagement with clutch parts 4 and 8 but will be sufficient to disengage the clutch parts 4 and 9.

Having thus described my invention, what I claim and desire to secure by Letters Patent is:

1. The combination in a power transmitting apparatus, of alined driving and driven shafts, a clutch member fixed upon the driving shaft, a clutch member splined and slidable upon the driven shaft to and from engagement with the clutch of the driving shaft so that said shafts may be directly connected for uniform rotary movement, frictional disks disposed upon opposite sides of said clutch members, each disk adaptable to engage both of said members, a mechanism for controlling the pressure of said disks upon opposite sides of the clutch members, and a connection between said mechanism and the clutch shifting device whereby the shiftable clutch member may be disengaged from the driving clutch member without bringing the friction disks into driving engagement with the clutch members.

2. In a power transmitting apparatus, the combination with alined driving and driven shafts, of a clutch member fixed to the driving shaft, a clutch member splined and slidable upon the driven shaft, beams disposed in spaced relation, on opposite sides of the alined shafts, anti-friction rollers mounted on each beam, bosses formed upon the ends of the beams, tension members engaged in the bosses, the bosses of one beam having cam faces, cams mounted on one of the ends of the tension members and engaged with the first cam faces, friction disks yieldably supported by the beams and disposed parallel with the alined shafts and having their outer faces engaged by the rollers, and means for rotating the second cams whereby the rollers and beams are moved toward each other, thereby holding the friction disks in engagement with the clutch members.

3. In a power transmitting apparatus, the combination with alined driving and driven shafts, of clutch members mounted on the respective shafts, tension members disposed transversely thereof, beams slidable on the members, anti-friction rollers mounted on the beams, friction disks rotatably supported by the beams and having their outer surfaces engaged by the rollers, one of said beams having cam faces on its ends, cams rotatably supported by one of the ends of the tension members and means for rotating the rotatable cams to control the pressure of the rollers on the disks and to hold the disks in frictional engagement with the clutch members.

4. In combination with a driving and driven shaft and clutch members mounted respectively on said shafts, a beam arranged on one side of the shafts, friction disks on the beam, means on the beam to engage the outer face of the disk, a pair of means to slidably support the beam, cams formed on the ends of the beam, cams rotatable on the beam supporting means and means to rotate the rotatable cams in unison to cause same to move the beam toward the shafts.

5. In combination with a driving and driven shaft and means to couple said shafts, movable means to engage the coupling means, and unitary means to both actuate the coupling means and the movable means to cause the latter to be engaged with the coupling means.

6. In combination with a driving and driven shaft and means to couple said shafts, movable means to engage the coupling means, and means connected to the coupling means and to said movable means whereby upon slight movement thereof the coupling means will be disengaged without moving the movable means into operative connection with the coupling means and upon continued movement will cause the movable means to operatively connect the coupling means.

In testimony whereof I have hereunto set my hand in the presence of two subscribing witnesses.

CHESTER McLAREN.

Witnesses:
JOHN H. HERRING,
W. W. HEALLY.

Copies of this patent may be obtained for five cents each, by addressing the "Commissioner of Patents, Washington, D. C."